United States Patent
O'Neill et al.

(10) Patent No.: US 11,448,147 B1
(45) Date of Patent: Sep. 20, 2022

(54) ENGINE STALL PROTECTION WITH VEHICLE HOLD AND TRAILER/PAYLOAD COMPENSATION ON GRADES USING ENGINE PROPULSION TORQUE

(71) Applicants: Alexander M O'Neill, Ann Arbor, MI (US); Sagar G Naidu, Rochester Hills, MI (US); Sean R King, Macomb, MI (US); Adam M Szechy, Jackson, MI (US)

(72) Inventors: Alexander M O'Neill, Ann Arbor, MI (US); Sagar G Naidu, Rochester Hills, MI (US); Sean R King, Macomb, MI (US); Adam M Szechy, Jackson, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/380,265

(22) Filed: Jul. 20, 2021

(51) Int. Cl.
*F02D 41/02* (2006.01)
*F02D 41/08* (2006.01)

(52) U.S. Cl.
CPC ........... *F02D 41/021* (2013.01); *F02D 41/08* (2013.01); *F02D 2200/501* (2013.01); *F02D 2200/602* (2013.01)

(58) Field of Classification Search
CPC .. F02D 41/021; F02D 41/08; F02D 2200/501; F02D 2200/602
See application file for complete search history.

(56) References Cited

U.S. PATENT DOCUMENTS

| | | | |
|---|---|---|---|
| 6,679,810 B1 | 1/2004 | Boll et al. | |
| 6,814,414 B1 | 11/2004 | Schmitt et al. | |
| 7,226,389 B2 | 6/2007 | Steen et al. | |
| 7,806,802 B2 | 10/2010 | Silveri et al. | |
| 7,828,694 B2 | 11/2010 | Silveri et al. | |
| 8,090,499 B2 | 1/2012 | Tamai | |
| 2007/0191181 A1 | 8/2007 | Burns | |
| 2013/0096797 A1* | 4/2013 | Whitney | B60W 30/18036 701/87 |
| 2015/0105990 A1* | 4/2015 | Chimner | B60T 7/12 701/1 |
| 2015/0210262 A1* | 7/2015 | Mitchell | B60W 10/023 180/65.265 |
| 2017/0136916 A1* | 5/2017 | Heisel | B60L 50/16 |

(Continued)

FOREIGN PATENT DOCUMENTS

EP 1995499 B1 4/2014
KR 20130008381 A 1/2013

*Primary Examiner* — Joseph J Dallo
(74) *Attorney, Agent, or Firm* — Ralph E. Smith

(57) ABSTRACT

A control system for a powertrain of a vehicle includes a set of sensors configured to monitor a set of operating parameters of the vehicle indicative of at least (i) whether a driver of the vehicle is in control of the vehicle, (ii) an intended direction of motion of the vehicle, and (iii) actual motion of the vehicle and a controller configured to, based on the set of operating parameters determine whether the driver of the vehicle is in control of the vehicle and when the driver is determined not to be in control of the vehicle determine whether the actual motion of the vehicle is in the intended direction of motion of the vehicle and when the actual motion of the vehicle is not in the intended direction of motion of the vehicle, control a torque output of the engine to hold the vehicle stationary.

20 Claims, 2 Drawing Sheets

(56) References Cited

U.S. PATENT DOCUMENTS

| | | | | |
|---|---|---|---|---|
| 2017/0136917 A1* | 5/2017 | Heisel | ................. | B60L 15/20 |
| 2018/0264970 A1* | 9/2018 | Lor | ................. | H02P 27/06 |
| 2018/0264971 A1* | 9/2018 | Lor | ................. | B60L 15/20 |

* cited by examiner

ENGINE STALL PROTECTION WITH VEHICLE HOLD AND TRAILER/PAYLOAD COMPENSATION ON GRADES USING ENGINE PROPULSION TORQUE

FIELD

The present application generally relates to vehicle powertrain control and, more particularly, to systems and methods for engine stall protection with vehicle hold and trailer/payload compensation on grades.

BACKGROUND

One type of vehicle powertrain includes an engine having a crankshaft that is selectively coupled to an input shaft of a transmission by a torque converter (e.g., a fluid coupling) for transfer of drive torque therebetween (e.g., from the engine to the transmission). In some instances, such as when the driver is not applying the accelerator or brake pedals and the vehicle is on an uphill or downhill grade, the vehicle could roll backwards or forwards in a direction opposing a direction intended by an engaged gear of the transmission (e.g., a forward drive gear or a reverse gear, respectively). This could potentially result in a stall of the engine due to the torque converter (when engaged) providing an oppositional force on the engine crankshaft. Conventional solutions to this problem are hardware-based, which typically involves physical transmission modifications or additional components such as friction brakes. This increases vehicle costs and complexity. Thus, while such conventional vehicle powertrain systems do work for their intended purpose, there remains a desire for improvement in the relevant art.

SUMMARY

According to one example aspect of the invention, a control system for a powertrain of a vehicle, the powertrain comprising an engine having a crankshaft selectively coupled to an input shaft of a transmission via a torque converter, is presented. In one exemplary implementation, the control system comprises a set of sensors configured to monitor a set of operating parameters of the vehicle indicative of at least (i) whether a driver of the vehicle is in control of the vehicle, (ii) an intended direction of motion of the vehicle, and (iii) actual motion of the vehicle and a controller configured to, based on the set of operating parameters determine whether the driver of the vehicle is in control of the vehicle and when the driver is determined not to be in control of the vehicle, determine whether the actual motion of the vehicle is in the intended direction of motion of the vehicle, and when the actual motion of the vehicle is not in the intended direction of motion of the vehicle, control a torque output of the engine to hold the vehicle stationary.

In some implementations, the controller is configured to perform feedback-based control of the engine torque output to hold the vehicle stationary. In some implementations, the feedback-based control of the engine torque output to hold the vehicle stationary comprises modulating an idle speed of the engine. In some implementations, the controller is configured to control the engine torque output to hold the vehicle stationary by increasing the idle speed of the engine by a predetermined amount. In some implementations, the controller is configured to perform the feedback-based control of the engine torque output to hold the vehicle stationary by maintaining a speed of the vehicle less than a threshold speed. In some implementations, the controller is configured to perform the feedback-based control of the engine torque output to hold the vehicle stationary for only a calibratable period of time after which the feedback-based control of the engine torque output ceases and the driver is requested to take control of the vehicle.

In some implementations, the set of operating parameters of the vehicle comprise at least accelerator and brake pedal pressures indicative of whether the driver of the vehicle is in control of the vehicle and speeds, directions, and temperatures of the powertrain and a driveline of the vehicle. In some implementations, the controller is configured to perform the feedback-based control of the engine torque output based on the set of operating parameters of the vehicle to hold the vehicle stationary by accounting for a grade of a road on which the vehicle is traveling and a trailer/payload associated with the vehicle. In some implementations, the feedback-based control of the engine torque output is a proportional-integral-derivative (PID) control scheme. In some implementations, the set of operating parameters comprises accelerator pedal and brake pedal pressures, a vehicle speed, propeller shaft speed and direction, a current gear of the transmission, individual wheel directions and pulse counts, engine and transmission coolant temperatures, and torque converter status and loss estimation.

According to another example aspect of the invention, a method of controlling a powertrain of a vehicle to hold a vehicle stationary via engine propulsion torque, the powertrain comprising an engine having a crankshaft selectively coupled to an input shaft of a transmission via a torque converter is presented. In one exemplary implementation, the method comprises monitoring, by a set of sensors, a set of operating parameters of the vehicle indicative of at least (i) whether a driver of the vehicle is in control of the vehicle, (ii) an intended direction of motion of the vehicle, and (iii) actual motion of the vehicle and, based on the set of operating parameters, determining, by a controller of the vehicle, whether the driver of the vehicle is in control of the vehicle and when the driver is determined not to be in control of the vehicle determining, by the controller, whether the actual motion of the vehicle is in the intended direction of motion of the vehicle, and when the actual motion of the vehicle is not in the intended direction of motion of the vehicle, controlling, by the controller, a torque output of the engine to hold the vehicle stationary.

In some implementations, controlling the torque output of the engine comprises performing feedback-based control of the engine torque output to hold the vehicle stationary. In some implementations, the feedback-based control of the engine torque output to hold the vehicle stationary comprises modulating an idle speed of the engine. In some implementations, controlling the engine torque output comprises controlling the engine torque output to hold the vehicle stationary by increasing the idle speed of the engine by a predetermined amount. In some implementations, the feedback-based control of the engine torque output to hold the vehicle stationary comprises maintaining a speed of the vehicle less than a threshold speed. In some implementations, the feedback-based control of the engine torque output to hold the vehicle stationary is for only a calibratable period of time after which the feedback-based control of the engine torque output ceases and the driver is requested to take control of the vehicle.

In some implementations, the set of operating parameters of the vehicle comprise at least accelerator and brake pedal pressures indicative of whether the driver of the vehicle is in control of the vehicle and speeds, directions, and temperatures of the powertrain and a driveline of the vehicle. In some implementations, the feedback-based control of the engine torque output based on the set of operating parameters of the vehicle to hold the vehicle stationary comprises accounting for a grade of a road on which the vehicle is traveling and a trailer/payload associated with the vehicle. In some implementations, the feedback-based control of the engine torque output is a proportional-integral-derivative (PID) control scheme. In some implementations, the set of operating parameters comprises accelerator pedal and brake pedal pressures, a vehicle speed, propeller shaft speed and direction, a current gear of the transmission, individual wheel directions and pulse counts, engine and transmission coolant temperatures, and torque converter status and loss estimation.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DETAILED DESCRIPTION

As previously discussed, conventional solutions to mitigating or preventing engine stall due to vehicle motion in an unintended direction are hardware-based, which typically involves physical transmission modifications or additional components such as friction brakes that increase vehicle costs and complexity. Accordingly, improved vehicle powertrain control systems and methods are presented. The techniques of the improved systems and methods are entirely software-based and thus do not require additional hardware, thereby saving on costs/complexity. The proposed techniques are an entirely software-based solution that is capable of holding the vehicle stationary when the driver is determined to not be in control of the vehicle and the vehicle moves in an unintended direction.

This is achieved through engine torque control, such as a feedback-based control scheme (e.g., proportional-integral-derivative, or PID control) based on a plurality of existing inputs. This feedback-based control scheme is also able to hold the vehicle stationary (e.g., less than a threshold speed) without knowing trailer/payload details since it is feedback-based and based on other inputs. In one implementation, this feature is only performed temporarily (e.g., for a few seconds), after which the feature is disabled and the driver is requested to take control of the vehicle (e.g., a notification to apply the accelerator/brake pedals). Potential benefits of this software-based solution include reduced costs and complexity as there is no need for additional hardware, as well as not needing to put excessive wear on other hardware systems (e.g., vehicle brakes).

Figure 1:
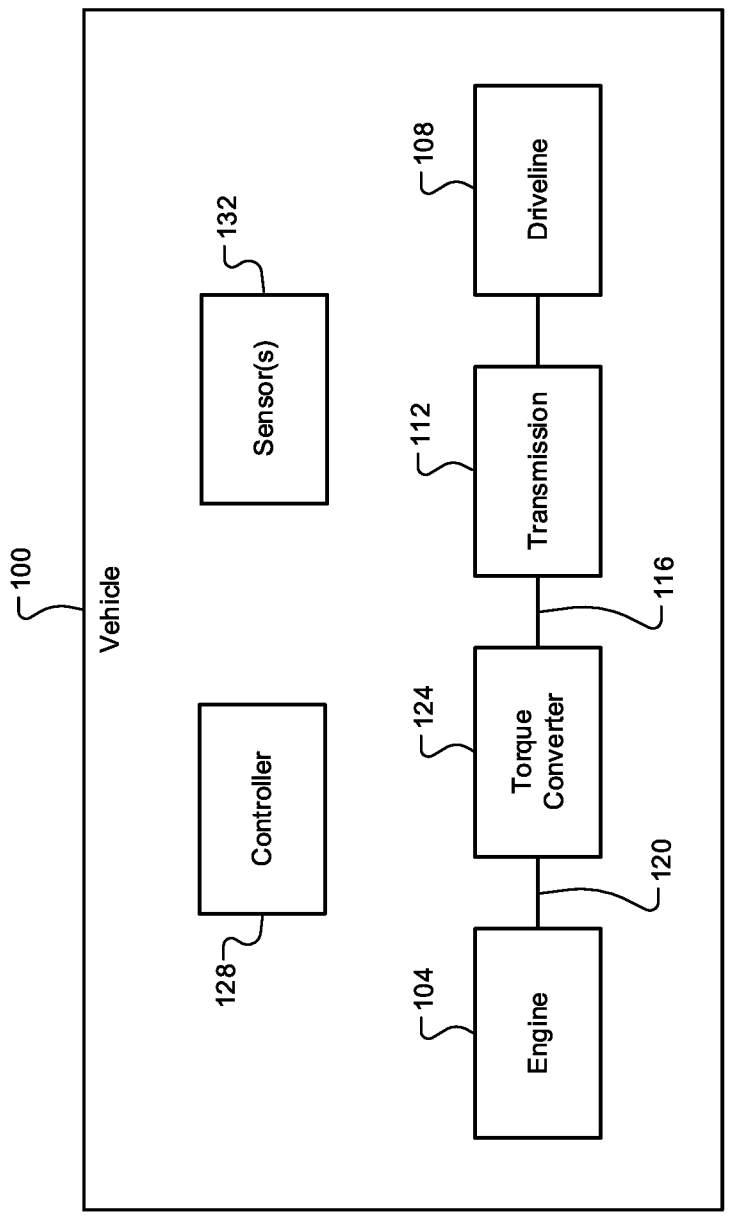
FIG. 1 is a functional block diagram of an example vehicle comprising a powertrain control system according to the principles of the present application.

Referring now to FIG. 1, a functional block diagram of an example vehicle 100 comprising a powertrain control system according to the principles of the present application is presented. The vehicle 100 generally comprises an internal combustion engine 104 configured to combust an air/fuel mixture within cylinders (not shown) to generate drive torque. The drive torque is transferred to a driveline 108 of the vehicle 100 via a transmission 112 having an input shaft 116 that is selectively coupled a crankshaft 120 of the engine 104 via a torque converter 124 (e.g., a fluid coupling).

The transmission 112 includes a plurality of engageable gears, including at least one forward drive gear and a reverse gear. The forward drive gear corresponds to a forward intended direction of motion and the reverse gear corresponds to a backwards intended direction of motion. In some cases, the vehicle 100 may potentially move in a direction opposing the intended direction of motion, such as when the vehicle 100 is on a grade (uphill, downhill, etc.). A controller 128 of the vehicle 100 is primarily configured to control the engine 104 to generate a desired amount of drive torque, such as in response to a driver input via an accelerator pedal (not shown).

A set of sensors 132 are configured to measure a set of operating parameters of the vehicle 100. This primarily includes driver intent indicative parameters and vehicle motion parameters. For example, the set of sensors 132 could be configured to monitor a set of operating parameters of the vehicle 100 indicative of at least (i) whether a driver of the vehicle 100 is in control of the vehicle, (ii) an intended direction of motion of the vehicle 100, and (iii) actual motion of the vehicle 100. In one exemplary implementation, the set of operating parameters comprises accelerator pedal and brake pedal pressures, a vehicle speed, propeller shaft speed and direction, a current gear of the transmission 112, individual wheel directions and pulse counts, engine and transmission coolant temperatures, and torque converter 124 status (e.g., engaged or disengaged) and loss estimation (e.g., torque loss from torque converter 124 to transmission 112). It will be appreciated that these are merely examples of the types of sensors that could be utilized and that less/more sensors or operating parameters could be monitored as part of the systems and methods of the present application.

Figure 2:
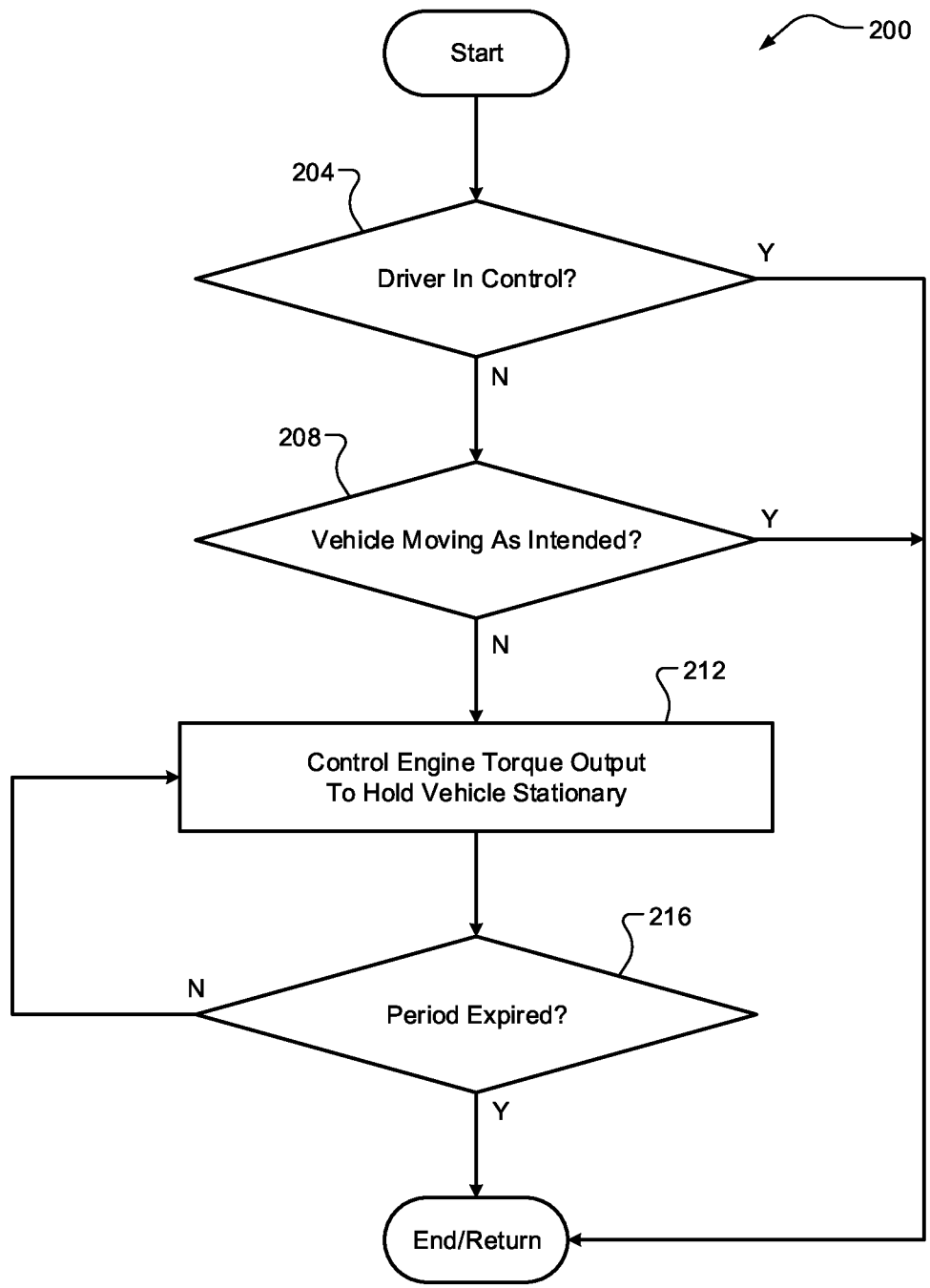
FIG. 2 is a flow diagram of an example method of vehicle powertrain control to hold the vehicle stationary via engine propulsion torque according to the principles of the present application.

Referring now to FIG. 2 and with continued reference to FIG. 1, a flow diagram of an example method 200 of vehicle powertrain control to hold the vehicle stationary via engine propulsion torque according to the principles of the present application is illustrated. While the components of the vehicle 100 of FIG. 1 are specifically referenced for illustrative/descriptive purposes, it will be appreciated that the method 200 could be applicable to any suitable vehicle having an engine and a torque converter. It will also be appreciated that some aspects of the present application (e.g., an engine idle speed-based control scheme) could be applicable to other vehicles not including torque converters. At 204, the controller 128 determines whether the driver of the vehicle 100 is in control of the vehicle 100 based on at least some of the set of operating parameters. These could include, for example, accelerator and brake pedal pressures. In other words, if the driver is applying pressure via either the accelerator or brake pedals than it could be assumed that the driver is in control of the vehicle 100. It will be appreciated that other inputs could be taken into account, such as steering wheel torque, a driver monitoring system, and the like. When the driver is determined to be in control of the vehicle 100, the method 200 ends or returns to 204. When the driver is determined to not be in control of the vehicle 100, the method 200 proceeds to 208.

At 208, the controller 128 determines whether the actual motion of the vehicle 100 is in the intended direction of motion of the vehicle 100 based on at least some of the set of operating parameters. When false (i.e., when the actual motion of the vehicle 100 is not in the intended direction of motion of the vehicle 100), the method 200 proceeds to 212. Otherwise, the method 200 ends or returns to 204. At 212, the controller 128 controls a torque output of the engine to hold the vehicle 100 stationary.

In one exemplary implementation, this includes performing feedback-based control (e.g., PID control) of the engine torque output to hold the vehicle 100 stationary. This could include, however, alternative schemes such as increasing an idle speed of the engine 104 (e.g., by a predetermined amount or in a feedback-based manner). In one exemplary implementation, the vehicle 100 is held stationary by maintaining a speed of the vehicle 100 less than a threshold speed. This feedback-based control of the engine torque output to hold the vehicle 100 stationary could be limited to only a calibratable period of time after which the feedback-based control of the engine torque output ceases and the driver is requested to take control of the vehicle 100.

This feedback-based control scheme could also include the controller 128 accounting for a grade of a road on which the vehicle 100 is traveling and a trailer/payload associated with the vehicle 100. By performing this in a feedback-based manner, the vehicle 100 does not need dedicated sensor(s) for trailer/payload monitoring, thereby saving on costs and complexity. At optional 216, the controller 128 determines if the calibratable period has expired. When true, the method 200 ends or returns to 204. Otherwise, the method 200 returns to 212 for continued control holding the vehicle 100 stationary.

As previously discussed, it will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a powertrain of a vehicle, the powertrain comprising an engine having a crankshaft coupled to an input shaft of a transmission via a torque converter, the control system comprising:
 a set of sensors configured to monitor a set of operating parameters of the vehicle indicative of at least (i) whether a driver of the vehicle is in control of the vehicle, (ii) an intended direction of motion of the vehicle, and (iii) actual motion of the vehicle; and
 a controller configured to, based on the set of operating parameters:
  determine whether the driver of the vehicle is in control of the vehicle; and
  when the driver is determined not to be in control of the vehicle:
   determine whether the actual motion of the vehicle is in the intended direction of motion of the vehicle,
   when the actual motion of the vehicle is in the intended direction of motion of the vehicle, temporarily allow the vehicle to move while the driver is not in control of the vehicle for a period or distance, and
   when the actual motion of the vehicle is not in the intended direction of motion of the vehicle, control a torque output of the engine to hold the vehicle stationary.

2. The control system of claim 1, wherein the controller is configured to perform feedback-based control of the engine torque output to hold the vehicle stationary.

3. The control system of claim 2, wherein the feedback-based control of the engine torque output to hold the vehicle stationary comprises modulating an idle speed of the engine.

4. The control system of claim 3, wherein the controller is configured to control the engine torque output to hold the vehicle stationary by increasing the idle speed of the engine by a predetermined amount.

5. The control system of claim 2, wherein the controller is configured to perform the feedback-based control of the engine torque output to hold the vehicle stationary by maintaining a speed of the vehicle less than a threshold speed.

6. The control system of claim 5, wherein the controller is configured to perform the feedback-based control of the engine torque output to hold the vehicle stationary for only a calibratable period of time after which the feedback-based control of the engine torque output ceases and the driver is requested to take control of the vehicle.

7. The control system of claim 1, wherein the set of operating parameters of the vehicle comprise at least:
 accelerator and brake pedal pressures indicative of whether the driver of the vehicle is in control of the vehicle; and
 speeds, directions, and temperatures of the powertrain and a driveline of the vehicle.

8. The control system of claim 7, wherein:
 the vehicle is configured to operate in a tow mode whereby the vehicle is connected to and towing an unknown payload; and
 while the vehicle is operating in the tow mode, the controller is configured to perform the feedback-based control of the engine torque output based on the set of operating parameters of the vehicle to hold the vehicle stationary by accounting for a grade of a road on which the vehicle is traveling and the unknown payload.

9. The control system of claim 8, wherein the feedback-based control of the engine torque output is a proportional-integral-derivative (PID) control scheme.

10. The control system of claim 7, wherein the set of operating parameters comprises:
 accelerator pedal and brake pedal pressures;
 a vehicle speed;
 propeller shaft speed and direction;
 a current gear of the transmission;
 individual wheel directions and pulse counts;
 engine and transmission coolant temperatures; and
 torque converter status and loss estimation.

11. A method of controlling a powertrain of a vehicle to hold a vehicle stationary via engine propulsion torque, the powertrain comprising an engine having a crankshaft selectively coupled to an input shaft of a transmission via a torque converter, the method comprising:

monitoring, by a set of sensors, a set of operating parameters of the vehicle indicative of at least (i) whether a driver of the vehicle is in control of the vehicle, (ii) an intended direction of motion of the vehicle, and (iii) actual motion of the vehicle; and based on the set of operating parameters:

determining, by a controller of the vehicle, whether the driver of the vehicle is in control of the vehicle; and when the driver is determined not to be in control of the vehicle:

determining, by the controller, whether the actual motion of the vehicle is in the intended direction of motion of the vehicle, when the actual motion of the vehicle is in the intended direction of motion of the vehicle, temporarily allowing, by the controller, the vehicle to move while the driver is not in control of the vehicle for a period or distance, and when the actual motion of the vehicle is not in the intended direction of motion of the vehicle, controlling, by the controller, a torque output of the engine to hold the vehicle stationary.

12. The method of claim 11, wherein controlling the torque output of the engine comprises performing feedback-based control of the engine torque output to hold the vehicle stationary.

13. The method of claim 12, wherein the feedback-based control of the engine torque output to hold the vehicle stationary comprises modulating an idle speed of the engine.

14. The method of claim 13, wherein controlling the engine torque output comprises controlling the engine torque output to hold the vehicle stationary by increasing the idle speed of the engine by a predetermined amount.

15. The method of claim 12, wherein the feedback-based control of the engine torque output to hold the vehicle stationary comprises maintaining a speed of the vehicle less than a threshold speed.

16. The method of claim 15, wherein the feedback-based control of the engine torque output to hold the vehicle stationary is for only a calibratable period of time after which the feedback-based control of the engine torque output ceases and the driver is requested to take control of the vehicle.

17. The method of claim 11, wherein the set of operating parameters of the vehicle comprise at least:

accelerator and brake pedal pressures indicative of whether the driver of the vehicle is in control of the vehicle; and speeds, directions, and temperatures of the powertrain and a driveline of the vehicle.

18. The method of claim 17, wherein:

the vehicle is configured to operate in a tow mode whereby the vehicle is connected to and towing an unknown payload; and while the vehicle is operating in the tow mode, the feedback-based control of the engine torque output based on the set of operating parameters of the vehicle to hold the vehicle stationary comprises accounting for a grade of a road on which the vehicle is traveling and the unknown payload.

19. The method of claim 18, wherein the feedback-based control of the engine torque output is a proportional-integral-derivative (PID) control scheme.

20. The method of claim 17, wherein the set of operating parameters comprises:

accelerator pedal and brake pedal pressures;

a vehicle speed;

propeller shaft speed and direction;

a current gear of the transmission;

individual wheel directions and pulse counts;

engine and transmission coolant temperatures; and torque converter status and loss estimation.

\* \* \* \* \*